(12) United States Patent
Breon et al.

(10) Patent No.: US 11,673,995 B2
(45) Date of Patent: Jun. 13, 2023

(54) POLYOL POLYMERS, METHODS OF PREPARING SUCH POLYMERS, AND COATING COMPOSITIONS CONTAINING THE SAME

(71) Applicant: PPG Industries Ohio, Inc., Cleveland, OH (US)

(72) Inventors: Jonathan P. Breon, Pittsburgh, PA (US); Hongying Zhou, Allison Park, PA (US); Tsukasa Mizuhara, Gibsonia, PA (US); Paul H. Lamers, Allison Park, PA (US); Gobinda Saha, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 542 days.

(21) Appl. No.: 16/535,859

(22) Filed: Aug. 8, 2019

(65) Prior Publication Data
US 2021/0040262 A1 Feb. 11, 2021

(51) Int. Cl.
*C08G 63/42* (2006.01)
*C09D 7/63* (2018.01)
*C09D 7/65* (2018.01)
*C09D 167/02* (2006.01)
*C08K 3/013* (2018.01)
*C08K 5/00* (2006.01)
*C08K 5/29* (2006.01)

(52) U.S. Cl.
CPC .............. *C08G 63/42* (2013.01); *C09D 7/63* (2018.01); *C09D 7/65* (2018.01); *C09D 167/025* (2013.01); *C08K 3/013* (2018.01); *C08K 5/0025* (2013.01); *C08K 5/0041* (2013.01); *C08K 5/29* (2013.01)

(58) Field of Classification Search
None
See application file for complete search history.

(56) References Cited

U.S. PATENT DOCUMENTS

| | | | |
|---|---|---|---|
| 4,098,735 A | 7/1978 | Tobias | |
| 4,119,609 A | 10/1978 | Allen et al. | |
| 4,252,935 A | 2/1981 | Anderson et al. | |
| 4,357,456 A | 11/1982 | Lopez et al. | |
| 4,438,254 A * | 3/1984 | Doorakian | C08G 59/066 528/89 |
| 4,559,383 A | 12/1985 | Holubka et al. | |
| 4,812,535 A | 3/1989 | Dervan et al. | |
| 4,855,385 A | 8/1989 | Cavitt | |
| 5,852,163 A * | 12/1998 | Chen | C08G 59/4292 528/274 |
| 6,057,382 A * | 5/2000 | Karim | C08L 63/00 522/122 |
| 7,217,758 B2 * | 5/2007 | Buckmann | C09D 5/02 524/502 |
| 9,828,485 B2 * | 11/2017 | Kannan | C08G 63/183 |
| 2004/0152830 A1 * | 8/2004 | Kim | C09D 167/00 524/599 |
| 2004/0171748 A1 * | 9/2004 | Ramesh | C09D 167/00 524/602 |
| 2008/0193689 A1 | 8/2008 | Masselin et al. | |
| 2009/0215951 A1 * | 8/2009 | Kust | C08L 33/08 525/540 |
| 2013/0178591 A1 | 7/2013 | Jin et al. | |
| 2015/0073117 A1 * | 3/2015 | Alidedeoglu | C08L 67/02 528/279 |
| 2015/0105518 A1 | 4/2015 | Maksimovic | |
| 2016/0090510 A1 | 3/2016 | Boespflug et al. | |
| 2017/0058081 A1 | 3/2017 | Tabor et al. | |

FOREIGN PATENT DOCUMENTS

JP 2013064059 A 4/2013

OTHER PUBLICATIONS

Technical Data Sheet for EPONEX Resin 1510 by Hexicon, 2 pages, Revised on Dec. 1, 2015, Downloaded on Apr. 18, 2022.*
Product brochures for polyethylene glycol (PEG, Mn 6,000) by Sigma-Aldrich, Downloaded on Aug. 26, 2022.*
Product brochures for polyethylene glycol (PEG, Mn 400) by Sigma-Aldrich, Downloaded on Aug. 26, 2022.*
Vijay M. Mannari: "Novel Self-Crosslinking Epoxy Oligomers for Cationic-Cure Coatings Applications", International Journal of Polymeric Materials., vol. 55, No. 5, May 1, 2006 (May 1, 2006), pp. 293-305, XP055737283, US ISSN: 0091-4037, DOI: 10.1080/009140390945150.

* cited by examiner

*Primary Examiner* — Tae H Yoon
(74) *Attorney, Agent, or Firm* — Krisanne Shideler

(57) ABSTRACT

A polyol polymer is obtained from reactants including: a) a non-aromatic epoxy functional compound that includes at least 30 weight % of the total solids weight of the reactants; and b) an aromatic mono-carboxylic acid functional compound, or anhydride thereof, that is substantially free of non-aromatic ethylenic unsaturation. The polyol polymer has ester linkages and hydroxyl functional groups. Further, if the reactants further include an aromatic polycarboxylic acid, the aromatic polycarboxylic acid makes up less than 15 weight % of the total solids weight of the reactants. A coating composition is also prepared with the polyol polymer.

20 Claims, No Drawings

POLYOL POLYMERS, METHODS OF PREPARING SUCH POLYMERS, AND COATING COMPOSITIONS CONTAINING THE SAME

FIELD OF THE INVENTION

The present invention relates to polyol polymers, methods of preparing the polymers, coating compositions containing the same, coatings formed from the coating compositions, and substrates at least partially coated with such coatings.

BACKGROUND OF THE INVENTION

Metallic substrates and other substrates having metallic portions are susceptible to corrosion, especially when exposed to certain environmental conditions. To prevent or reduce the corrosion of such substrates, a coating that inhibits corrosion of these substrates is typically applied over the surface. These coatings can be applied directly over the substrate as a single coating layer, or additional coating layers can be applied over the corrosion inhibiting coating layer to provide other properties including color, abrasion resistance, and chemical resistance. While coatings have been developed to reduce corrosion of metallic containing substrates, it is desirable to provide improved coatings that more effectively reduce or prevent corrosion and which also provide other desirable properties such as good appearance.

SUMMARY OF THE INVENTION

The present invention relates to a polyol polymer obtained from reactants comprising: a) a non-aromatic epoxy functional compound that comprises at least 30 weight % of the total solids weight of the reactants; and b) an aromatic mono-carboxylic acid functional compound, or anhydride thereof, that is substantially free of non-aromatic ethylenic unsaturation. The polyol polymer comprises ester linkages and hydroxyl functional groups. Further, if the reactants further comprise an aromatic polycarboxylic acid, the aromatic polycarboxylic acid comprises less than 15 weight % of the total solids weight of the reactants.

The present invention further includes a coating composition comprising the previously described polymer and a crosslinker reactive with the polymer.

The present invention also includes a method of forming a polyol polymer. The method includes reacting reactants comprising: a) a non-aromatic epoxy functional compound that comprises at least 30 weight % of the total solids weight of the reactants; and b) an aromatic mono-carboxylic acid functional compound, or anhydride thereof, that is substantially free of non-aromatic ethylenic unsaturation. The polyol polymer comprises ester linkages and hydroxyl functional groups. Further, if the reactants further comprise an aromatic polycarboxylic acid, the aromatic polycarboxylic acid comprises less than 15 weight % of the total solids weight of the reactants.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" coating composition, "a" crosslinker, and the like refer to one or more of any of these items.

As indicated, the polymer of the present invention comprises a polyol polymer obtained from reactants comprising at least a non-aromatic epoxy functional compound and an aromatic mono-carboxylic acid functional compound which is substantially free of non-aromatic ethylenic unsaturation.

As used herein, a "polyol polymer" refers to a polymer having two or more, such as three or more, hydroxyl functional groups. The term "polymer" refers to oligomers and homopolymers (e.g., prepared from a single monomer species), copolymers (e.g., prepared from at least two different monomer species), terpolymers (e.g., prepared from at least three different monomer species) and graft polymers. The term "resin" is used interchangeably with "polymer."

A "non-aromatic epoxy functional compound" refers to a linear, branched, or cyclic compound having epoxy functional groups and which is free of aromatic groups. As used herein, the term "aromatic" refers to a conjugated cyclic hydrocarbon structure with a stability (due to delocalization) that is significantly greater than that of a hypothetical localized structure. Further, the term "linear" refers to a compound having a straight chain, the term "branched" refers to a compound having a chain with a hydrogen replaced by a substituent such as an alkyl group that branches or extends out from a straight chain, and the term "cyclic" refers to a closed ring structure. Thus, the epoxy functional compound is an aliphatic compound, i.e. a non-aromatic linear, branched, or cyclic structure that contains saturated carbon bonds.

Non-limiting examples of suitable non-aromatic epoxy functional compounds include a cycloaliphatic diglycidyl ether, a cycloaliphatic diglycidyl ester, a cycloaliphatic epoxide, or a combination thereof. A "cycloaliphatic diglycidyl ether" refers to a non-aromatic cyclic compound comprising one or more ether groups and at least two epoxy functional groups, such as for example hydrogenated bisphenol A epoxide. A "cycloaliphatic diglycidyl ester" refers to a non-aromatic cyclic compound comprising one or more esters groups and at least two epoxy functional groups, such as for example 1,2-cyclohexanedicarboxylic acid, 1,2-bis(2-oxiranylmethyl) ester. A "cycloaliphatic epoxide" refers to a non-aromatic cyclic compound comprising one or more epoxy functional groups and which does not include glycidyl ester or glycidyl ether groups, such as for example 3,4-epoxycyclohexylmethyl-3,4-epoxycyclohexanecarboxylate, bis((3,4-epoxycyclohexyl)methyl)adipate, or a combination thereof.

As indicated, the non-aromatic epoxy functional compound can be selected from compounds prepared from a hydrogenated bisphenol polyepoxide or a polyepoxide derived from a hydrogenated bisphenol compound. For example, the non-aromatic epoxy functional compound can comprise a cycloaliphatic diglycidyl ether formed from a hydrogenated bisphenol polyepoxide or a polyepoxide derived from a hydrogenated bisphenol compound.

The non-aromatic epoxy functional compound can also comprise additional functional groups. For example, the non-aromatic epoxy functional compound can also comprise ester groups, ether groups, nitro groups, nitrile groups, keto functional groups (also referred to as ketone functional groups), aldo functional groups (also referred to as aldehyde functional groups), amine groups, hydroxyl groups, thiol groups, carbamate groups, amide groups, urea groups, isocyanate groups (including blocked isocyanate groups), ethylenically unsaturated groups, and combinations thereof. Alternatively, the non-aromatic epoxy functional compound can also be free of (i.e., does not contain) any one of the previously described additional functional groups.

As used herein, "ethylenically unsaturated" refers to a group having at least one carbon-carbon double bond. Non-limiting examples of ethylenically unsaturated groups include, but are not limited to, (meth)acrylate groups, vinyl groups, other alkenyl groups, and combinations thereof. As used herein, the term "(meth)acrylate" refers to both the methacrylate and the acrylate.

The non-aromatic epoxy functional compound can comprise at least 30 weight %, at least 40 weight %, at least 50 weight %, or at least 60 weight %, based on the total solids weight of the reactants used to form the polyol polymer. The non-aromatic epoxy functional compound can comprise up to 90 weight %, up to 80 weight %, up to 70 weight %, or up to 65 weight %, based on the total solids weight of the reactants used to form the polyol polymer. The non-aromatic epoxy functional compound can also comprise an amount within a range, such as for example, of from 30 weight % to 90 weight %, or from 40 weight % to 80 weight %, or from 50 weight % to 70 weight %, or from 60 weight % to 70 weight %, based on the total solids weight of the reactants used to form the polyol polymer.

As previously described, the polyol polymer is also prepared with an aromatic mono-carboxylic acid functional compound that is substantially free of non-aromatic ethylenic unsaturation. As used herein, an "aromatic mono-carboxylic acid functional compound" refers to a compound that includes a cyclically conjugated hydrocarbon with a stability that is significantly greater than that of a hypothetical localized structure and which also includes a single carboxylic acid group or the ester or anhydride of the acid.

As indicated, the aromatic mono-carboxylic acid functional compound is substantially free of non-aromatic ethylenic unsaturation. The aromatic mono-carboxylic acid functional compound can also be essentially free or completely free of non-aromatic ethylenic unsaturation. The term "non-aromatic ethylenic unsaturation" refers to carbon-carbon double bonds that do not form a part of a cyclically conjugated hydrocarbon aromatic group. Further, the terms "substantially free of non-aromatic ethylenic unsaturation" means that the mixture of reactants contains less than 1000 parts per million (ppm) of compounds containing non-aromatic ethylenic unsaturation, "essentially free of non-aromatic ethylenic unsaturation" means that the mixture of reactants contains less than 100 ppm of compounds containing non-aromatic ethylenic unsaturation, and "completely free of non-aromatic ethylenic unsaturation" means that the mixture of reactants contains less than 20 parts per billion (ppb) of compounds containing non-aromatic ethylenic unsaturation.

The aromatic mono-carboxylic acid functional compound can also comprise additional functional groups. For example, the aromatic mono-carboxylic acid functional compound can also comprise any of the additional functional groups previously described provided that the aromatic mono-carboxylic acid functional compound is substantially free, essentially free, or completely free of non-aromatic ethylenic unsaturation. Alternatively, the aromatic mono-carboxylic acid functional compound is free of (i.e., does not contain) any of the previously described additional functional groups.

Non-limiting examples of aromatic monoacids that can be used to prepare the polymer include benzoic acid, 4-tert-butylbenzoic acid, hydroxybenzoic acids such as 4-hydroxybenzoic acid, salicylic acid, naphthoic acids, amino benzoic acids such as 4-aminobenzoic acid, nitrobenzoic acids such as 4-nitrobenzoic acid, 3,5-dinitrobenzoic acid, phenylpropanoic acid, mandelic acid, 3-benzoylpropanoic acid, anthranilic acid, nicotinic acid, picolinic acid, anhydrides of such acids, and combinations thereof.

The aromatic mono-carboxylic acid functional compound can comprise at least 10 weight %, at least 15 weight %, at least 20 weight %, at least 25 weight %, or at least 30 weight %, based on the total solids weight of the reactants used to form the polyol polymer. The aromatic mono-carboxylic acid functional compound can comprise up to 45 weight %, up to 40 weight %, or up to 35 weight %, based on the total solids weight of the reactants used to form the polyol polymer. The aromatic mono-carboxylic acid functional compound can also comprise an amount within a range, such as for example, of from 10 weight % to 45 weight %, or from 15 weight % to 40 weight %, or from 15 weight % to 35 weight %, or from 20 weight % to 35 weight %, based on the total solids weight of the reactants used to form the polyol polymer.

The reactants that form the polyol polymer may further comprise an aromatic polycarboxylic acid provided that the aromatic polycarboxylic acid is less than 15 weight %, less than 10 weight %, less than 5 weight % or less than 1 weight %, based on the total solids weight of the reactants used to form the polyol polymer. The reactants that form the polyol polymer can also be substantially free, essentially free, or completely free of an aromatic polycarboxylic acid. That is, the reactants that form the polyol polymer may be substantially free of aromatic polycarboxylic acids in which the mixture of reactants contain less than 1000 ppm of aromatic polycarboxylic acids, essentially free of aromatic polycarboxylic acids in which the mixture of reactants contain less than 100 ppm of aromatic polycarboxylic acids, and completely free of aromatic polycarboxylic acids in which the mixture of reactants contain less than 20 ppb of aromatic polycarboxylic acids.

As used herein, an "aromatic polycarboxylic acid" refers to a compound that includes a cyclically conjugated hydrocarbon with a stability that is significantly greater than that of a hypothetical localized structure and which also includes a two or more carboxylic acid groups or the anhydride of the acid. Non-limiting examples of aromatic polycarboxylic acids include terephthalic acid, isophthalic acid, orthophthalic acid, trimellitic acid, anhydrides of such acids, and combinations thereof.

The aromatic polycarboxylic acid can also comprise additional functional groups. For example, the aromatic polycarboxylic acid can also comprise any of the additional functional groups previously described. Alternatively, the aromatic polycarboxylic acid is free of (i.e., does not contain) any of the previously described additional functional groups.

The polyol polymer can also be prepared with additional reactants. For example, the reactants that form the polyol polymer may further comprise non-aromatic carboxylic acids such as non-aromatic mono-carboxylic acids, non-aromatic polycarboxylic acids, anhydrides of such acids, and combinations thereof.

As used herein, a "non-aromatic mono-carboxylic acid" refers to a straight, branched, or cyclic structure that contains saturated carbon bonds, a single carboxylic acid, or anhydride thereof, and which is free of aromatic groups. Further, a "non-aromatic polycarboxylic acid" refers to a straight, branched, or cyclic structure that contains saturated carbon bonds, two or more carboxylic acids, or anhydrides thereof, and which is free of aromatic groups.

The non-aromatic mono-carboxylic acid and/or non-aromatic polycarboxylic acid can also comprise additional functional groups. For example, the non-aromatic mono-carboxylic acid and/or non-aromatic polycarboxylic acid can also comprise any of the additional functional groups previously described. For example, the non-aromatic mono-carboxylic acid and/or non-aromatic polycarboxylic acid can also comprise hydroxyl functional groups. Alternatively, the non-aromatic mono-carboxylic acid and/or non-aromatic polycarboxylic acid are free of (i.e., does not contain) any of the previously described additional functional groups.

Non-limiting examples of non-aromatic mono-carboxylic acids include cycloaliphatic carboxylic acids such as cyclohexane carboxylic acid, $C_1$-$C_{18}$ linear or branched carboxylic acids such as acetic acid, propanoic acid, butanoic acid, hexanoic acid, heptanoic acid, and octanoic acid, anhydrides of such acids, and combinations thereof.

Non-limiting examples of non-aromatic polycarboxylic acids include 1,4-cyclohexanedicarboxylic acid, 1,3-cyclohexanedicarboxylic acid, decahydronaphthalene dicarboxylic acid, 1,3-cyclopentanedicarboxylic acid, 1,1-cyclopropanedicarboxylic acid, hexahydrophthalic acid, succinic acid, acipic acid, azelaic acid, citric acid, anhydrides of such acids, and combinations thereof.

When used to form the polyol polymer, the non-aromatic mono-carboxylic acid and/or non-aromatic polycarboxylic acid can each independently comprise at least 1 weight %, at least 3 weight %, or at least 5 weight %, based on the total solids weight of the reactants used to form the polyol polymer. The non-aromatic mono-carboxylic acid and/or non-aromatic polycarboxylic acid can each independently comprise up to 25 weight %, up to 15 weight %, or up to 10 weight %, based on the total solids weight of the reactants used to form the polyol polymer. The non-aromatic mono-carboxylic acid and/or non-aromatic polycarboxylic acid can also each independently comprise an amount within a range, such as for example, of from 1 weight % to 25 weight %, or from 3 weight % to 15 weight %, or from 5 weight % to 15 weight %, or from 5 weight % to 10 weight %, based on the total solids weight of the reactants used to form the polyol polymer.

Other additional reactants that can be used to form the polyol polymer include intramolecular cyclic esters. An "intramolecular cyclic ester" refers to a cyclic ring in which an ester linkage is part of the ring structure. The intramolecular cyclic ester can comprise, for example, a cyclic mono-ester or di-ester. Non-limiting examples of intramolecular cyclic esters include a lactone, lactide, glycolide, or a combination thereof. A "lactone" refers to a cyclic ester having a ring structure with two or more carbon atoms and a single oxygen atom with a ketone group in one of the carbons adjacent to the other oxygen. A "lactide" refers to a cyclic di-ester obtained from two or more molecules of lactic acid, and a "glycolide" refers to a cyclic ester obtained by dehydration of two water molecules from two glycolic acid molecules. Non-limiting examples of suitable lactones include ε-caprolactone, β-propiolactone, γ-butyrolactone, δ-valerolactone, and combinations thereof. Non-limiting examples of suitable lactides include L-lactide, D-lactide, DL-lactide, and combinations thereof.

When used to form the polyol polymer, the intramolecular cyclic ester can comprise at least 1 weight %, at least 3 weight %, or at least 5 weight %, based on the total solids weight of the reactants used to form the polyol polymer. The intramolecular cyclic ester can comprise up to 50 weight %, or up to 40 weight %, or up to 30 weight %, or 20 weight %, or up to 15 weight %, or up to 10 weight %, based on the total solids weight of the reactants used to form the polyol polymer. The intramolecular cyclic ester can comprise an amount within a range, such as for example, of from 1 weight % to 50 weight %, or from 3 weight % to 40 weight %, or from 5 weight % to 30 weight %, or from 5 weight % to 20 weight %, based on the total solids weight of the reactants used to form the polyol polymer.

The present invention is also directed to a method of preparing the previously described polyol polymer. The method can comprise mixing and reacting all the desired reactants at the same time to form the polyol polymer. Alternatively, the reactants can be reacted in a stepwise manner by first mixing and reacting only a portion of the reactants to form a preliminary reaction product and then mixing and reacting the remaining reactants with the preliminary reaction product to form the polyol polymer. For example, the polyol polymer can be prepared by first reacting reactants comprising the non-aromatic epoxy functional compound and the aromatic mono-carboxylic acid functional compound which is substantially free of non-aromatic ethylenic unsaturation to form a preliminary reaction product, and then reacting the preliminary reaction product with additional reactants such as an intramolecular cyclic ester.

Various types of reaction aids can also be added to the reaction mixture including, but not limited to, catalysts. Non-limiting examples of catalysts include triphenylphosphine, ethyltriphenylphosphonium iodide, butyl stannoic acid, and combinations thereof.

The reactants and other optional components can also be combined and reacted in a liquid medium such as a non-aqueous liquid medium. As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5% water, based on the total weight of the liquid medium. The solvents that make up more than 50 weight % of the liquid medium include organic solvents. Non-limiting examples of suitable organic solvents include polar organic solvents e.g. protic organic solvents such as glycols, glycol ether alcohols, alcohols; and ketones, glycol diethers, esters, and diesters. Other non-limiting examples of organic solvents include aromatic and aliphatic hydrocarbons.

The resulting polyol polymer of the present invention comprises ester linkages and hydroxyl functional groups. The polyol polymer can also comprise other linkages and functional groups. For example, the polyol polymer can also comprise ether linkages and/or any of the additional functional groups previously described such as epoxy functional groups and/or carboxylic acid functional groups.

The polyol polymer prepared from the reactants described above can have a hydroxyl value of at least 50 mg KOH/g, at least 75 mg KOH/g, or at least 100 mg KOH/g. The polyol polymer prepared from the reactants described above can also have a hydroxyl value of up to 300 mg KOH/g, at least 250 mg KOH/g, or at least 200 mg KOH/g. The polyol polymer product prepared from the reactants described above can further have a hydroxyl value within a range of from 50 to 300 mg KOH/g, or from 75 to 250 mg KOH/g, or from 100 to 200 mg KOH/g.

The hydroxyl value is determined by esterification of the sample with excess acetic anhydride. The excess acetic anhydride is converted to acetic acid by hydrolysis and titrated potentiometrically with standard potassium hydroxide. The volume difference of titrate potassium hydroxide between a blank (no reaction) and the sample corresponds to the acid content of the sample, from which the hydroxyl number is calculated as the number of milligrams of potassium hydroxide needed to neutralize the acid in one gram of the sample. The hydrolyzing solution used in the determination is a mixture of dimethylformamide, pyridine, and distilled water, and the acetylating reagent is a mixture of acetic anhydride and dichloroethane with p-toluene sulphonic acid as the catalyst.

The polyol polymer prepared from the reactants can comprise a weight average molecular weight of less than 10,000 g/mol, less than 8,000 g/mol, less than 6,000 g/mol, or less than 5,000 g/mol. The weight average molecular weight is determined by Gel Permeation Chromatography using a Waters 2695 separation module with a Waters 410 differential refractometer (RI detector) and polystyrene standards in which tetrahydrofuran (THF) is used as the eluent at a flow rate of 1 ml min' and two PL Gel Mixed C columns used for separation.

The polyol polymer prepared from the reactants can have a polydispersity index (PDI) of at least 1.05, at least 1.2, or at least 1.3. The polyol polymer prepared from the reactants can have a PDI of up to 3.50, up to 2.5, or up to 1.8. The polyol polymer prepared from the reactants can also have a PDI within a range such as, for example, of from 1.05 to 3.50, or from 1.2 to 2.5, or from 1.3 to 1.8. The PDI values represent a ratio of the weight average molecular weight (Mw) to the number average molecular weight (Mn) of the polymer (i.e., Mw/Mn). The weight average molecular weight and polydispersity index and the number average molecular weight are determined by gel permeation chromatography as previously described with respect to the weight average molecular weight.

The polyol polymer prepared from the reactants can also comprise a particular equivalent ratio of functional groups. For instance, when the polyol polymer comprises epoxy and carboxylic acid functional groups, the equivalent ratio of epoxy functional groups to acid functional groups is from 0.95:5.0, or from 1.10 to 2.0, or from 1.15 to 1.5.

The present invention is also directed to a coating composition that comprises the polyol polymer and a crosslinker(s) reactive with one or more functional groups of the polyol polymer. It is appreciated that the polyol polymer in the coating composition acts as a film-forming resin. As used herein, a "film-forming resin" refers to a self-supporting continuous film on at least a horizontal surface of a substrate upon removal of any diluents or carriers present in the composition or upon curing. The terms "curable", "cure", and the like, as used in connection with a coating composition, means that at least a portion of the components that make up the coating composition are polymerizable and/or crosslinkable. The coating composition of the present invention can be cured at ambient conditions, with heat, or with other means such as actinic radiation. The term "actinic radiation" refers to electromagnetic radiation that can initiate chemical reactions. Actinic radiation includes, but is not limited to, visible light, ultraviolet (UV) light, X-ray, and gamma radiation. Further, "ambient conditions" refers to the conditions of the surrounding environment (e.g., the temperature, humidity, and pressure of the room or outdoor environment in which the substrate is located such as, for example, at a temperature of 23° C. and at a relative humidity in the air of 35% to 75%).

The coating composition can comprise one or more of the polyol polymers previously described. For instance, the coating composition can comprise at least one polyol polymer that is not prepared with an intramolecular cyclic ester and at least one polyol polymer that is prepared with an intramolecular cyclic ester.

The polyol polymer can comprise at least 15 weight %, at least 20 weight %, at least 25 weight %, or at least 30 weight %, based on the total weight of the coating composition. The polyol polymer can comprise up to 80 weight %, up to 70 weight %, up to 60 weight %, or up to 50 weight %, based on the total weight of the coating composition. The polyol polymer can comprise an amount within a range such as, for example, from 15 to 80 weight %, or from 20 to 70 weight %, or from 25 to 60 weight %, or from 30 to 50 weight %, based on the total weight of the coating composition.

As previously described, the coating composition comprises a crosslinker(s) reactive with one or more functional groups of the polyol polymer. As used herein, the term "crosslinker" refers to a molecule comprising two or more functional groups that are reactive with other functional groups and which is capable of linking two or more monomers or polymer molecules through chemical bonds such as during a curing process. Thus, the coating composition comprises a crosslinker having functional groups that are reactive with at least some of the functional groups on the polyol polymer.

Non-limiting examples of crosslinkers include carbodiimides, polyhydrazides, aziridines, epoxy resins, alkylated carbamate resins, (meth)acrylates, isocyanates, blocked isocyanates, polyacids, polyamines, polyamides, aminoplasts such as melamine-formaldehyde resins, hydroxyalkyl ureas, hydroxyalkyl amides, and any combination thereof. For instance, the crosslinker can comprise a polyisocyanate, aminoplast, or a combination thereof that is reactive with at least the hydroxyl functional groups on the polyol polymer.

It is appreciated that the coating composition can include a single type or multiple types of crosslinkers. For instance, the coating composition can comprise at least two different types of crosslinkers that are reactive with the same functional groups or different functional groups on the polyol polymer. The coating composition can also comprise at least two different types of crosslinkers that are reactive with different types of polyol polymers when used as previously described.

The coating composition can also comprise additional components. For example, the coating composition can also comprise additional film-forming resins. The additional resins can include any of a variety of thermoplastic and/or thermosetting resins known in the art. As used herein, the term "thermosetting" refers to resins that "set" irreversibly upon curing or crosslinking, wherein the polymer chains are joined together by covalent bonds. This property is usually associated with a cross-linking reaction often induced, for example, by heat or radiation. Curing or crosslinking reactions also may be carried out under ambient conditions. Once cured, a thermosetting resin will not melt upon the application of heat and is insoluble in solvents. As noted, the additional resins can also include a thermoplastic resin. As used herein, the term "thermoplastic" refers to resins that include polymeric components that are not joined by covalent bonds and, thereby, can undergo liquid flow upon heating.

The additional resins can be selected from, for example, (meth)acrylic polymers, polyurethanes, polyester polymers, polyamide polymers, polyether polymers, polysiloxane polymers, epoxy resins, vinyl resins, copolymers thereof, and mixtures thereof. Thermosetting resins typically comprise reactive functional groups. The reactive functional groups can include, but are not limited to, carboxylic acid groups, amine groups, epoxide groups, alkoxy groups, hydroxyl groups, thiol groups, carbamate groups, amide groups, urea groups, isocyanate groups (including blocked isocyanate groups), and combinations thereof.

Coating compositions containing thermosetting resins are typically reacted with a crosslinker. As such, when additional film-forming resins are used in the coating composition, the coating composition can comprise additional crosslinkers that are reactive with the additional film-forming resins and/or the crosslinker reactive with the polyol polymer can also be reactive with the additional film-forming resin. Non-limiting examples of such crosslinkers include any of the crosslinkers previously described. The thermosetting resins can also have functional groups that are reactive with themselves; in this manner, such resins are self-crosslinking.

The coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., and CHARISMA COLORANTS and MAXITONER INDUSTRIAL COLORANTS commercially available from Accurate Dispersions Division of Eastman Chemical, Inc.

Other non-limiting examples of components that can be used with the coating compositions of the present invention include plasticizers, abrasion resistant particles, fillers including, but not limited to, micas, talc, clays, and inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, additional corrosion-inhibitors, and other customary auxiliaries.

The components that form the coating composition can also be combined and/or mixed in a liquid medium. For example, the polyol polymer, crosslinker reactive with the polyol polymer, and optional other components previously described can be combined and mixed in a non-aqueous liquid medium.

After forming the coating composition of the present invention, the composition can be applied to a wide range of substrates known in the coatings industry. For example, the coating composition of the present invention can be applied to automotive substrates and components (e.g. automotive vehicles including, but not limited to, cars, buses, trucks, trailers, etc.), industrial substrates, aircraft and aircraft components, marine substrates and components such as ships, vessels, and on-shore and off-shore installations, storage tanks, windmills, nuclear plants, packaging substrates, wood flooring and furniture, apparel, electronics, including housings and circuit boards, glass and transparencies, sports equipment, including golf balls, stadiums, buildings, bridges, and the like. These substrates can be, for example, metallic or non-metallic.

Metallic substrates include, but are not limited to, tin, steel (including electrogalvanized steel, cold rolled steel, hot-dipped galvanized steel, steel alloys, or blasted/profiled steel, among others), aluminum, aluminum alloys, zinc-aluminum alloys, steel coated with a zinc-aluminum alloy, and aluminum plated steel. As used herein, blasted or profiled steel refers to steel that has been subjected to abrasive blasting and which involves mechanical cleaning by continuously impacting the steel substrate with abrasive particles at high velocities using compressed air or by centrifugal impellers. The abrasives are typically recycled/reused materials and the process can efficiently removal mill scale and rust. The standard grades of cleanliness for abrasive blast cleaning is conducted in accordance with BS EN ISO 8501-1.

Further, non-metallic substrates include polymeric and plastic substrates including polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethylene terephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather, both synthetic and natural, and the like. It is appreciated that the coating compositions can be applied to various areas of any of the previously described substrates to form a continuous solid coating such as over the body and edges of a substrate and which provides the superior properties described herein.

The coating compositions of the present invention can be applied by any means standard in the art, such as electrocoating, spraying, electrostatic spraying, dipping, rolling, brushing, and the like. The coatings formed from the coating compositions of the present invention can be applied to a dry film thickness of 5 to 300 microns, 20 to 150 microns, or 35 to 70 microns.

The coating composition can be applied to a substrate to form a monocoat. As used herein, a "monocoat" refers to a single layer coating system that is free of additional coating layers. Thus, the coating composition can be applied directly to a substrate without any intermediate coating layer and cured to form a single layer coating, i.e. a monocoat. The coating composition can also be applied directly over a pretreated substrate as a monocoat. For example, the substrate can be pretreated with an iron phosphate treatment, zinc phosphate treatment, zirconium treatment, titanium treatment, or silane treatment.

Alternatively, the coating composition can be applied to a substrate as a first coating layer along with additional coating layers, such as a second coating layer, to form a multi-layer coating system. It is appreciated that the multi-layer coating can comprise multiple coating layers such as three or more, or four or more, or five or more, coating layers. For example, the previously described coating composition of the present invention can be applied to a substrate as a primer layer and second and third coating layers, and, optionally, additional coatings layers, can be applied over the primer layer as basecoats and/or topcoats. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally, including components (such as pigments) that impact the color and/or provide other visual impact, and which may be overcoated with a protective and decorative topcoat.

The additional coating layers, such as a second and third coating layer, can be formed from a coating composition that includes a film-forming resin that is the same or different from the first coating layer. The additional coating layers can be prepared with any of the film-forming resins, crosslinkers, colorants, and/or other components previously described. Further, each coating composition can be applied as a dry-on-dry process where each coating composition is dried or cured to form a coating layer prior to application of another composition coating. Alternatively, all or certain combinations of each coating composition described herein can be applied as a wet-on-wet process and dried or cured together.

It was found that coatings formed form the coating compositions of the present invention comprising the polyol polymer provided improved corrosion resistance and good viscosity at low levels of VOC's. The coatings formed form the coating compositions of the present invention comprising the polyol polymer also provided fast property development (e.g., Konig hardness) while maintaining good appearance and improved 20 degree gloss.

The following examples are presented to demonstrate the general principles of the invention. The invention should not be considered as limited to the specific examples presented. All parts and percentages in the examples are by weight unless otherwise indicated.

Example 1

Preparation of a Polyester Polyol

A polyester polyol according to the present invention was prepared from the components listed in Table 1.

TABLE 1

| Ingredients | Parts by weight |
|---|---|
| Charge 1 | |
| EPONEX ™ 1510[1] | 1000.00 |
| Dimethylol Propionic Acid | 125.36 |
| Benzoic Acid | 342.39 |
| Ethyltriphenylphosphonium iodide (ETPPI) | 7.34 |
| Triphenyl phosphite | 7.34 |
| Charge 2 | |
| Butyl acetate | 370.61 |

[1]A hydrogenated bisphenol-A epoxy functional resin, commercially available from Hexion Specialty Chemicals.

Charge 1 was added to a 3000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 150° C. After exotherm, the reaction mixture was held at 150° C. until an acid value of less than 0.2 mg KOH/g was obtained with a Metrohm 888 Titrando using a 0.1 N KOH solution in methanol as the reagent (3-4 hours). The reaction mixture was then cooled to 85° C. and Charge 2 was added to the reaction mixture. The final resin was stirred at 60° C. for 30 minutes and poured out. The weight average molecular weight of the polyester polyol was 994 g/mol and solids content was 80%.

The weight average molecular weight was determined by Gel Permeation Chromatography using a Waters 2695 separation module with a Waters 410 differential refractometer (RI detector) and polystyrene standards. Tetrahydrofuran (THF) was used as the eluent at a flow rate of 1 ml min', and two PL Gel Mixed C columns were used for separation.

Example 2

Preparation of a Polyester Polyol

A polyester polyol according to the present invention was prepared from the components listed in Table 2.

TABLE 2

| Ingredients | Parts by weight |
|---|---|
| Charge 1 | |
| Polyester of Example 1 | 500.00 |
| PURALACT ® B3 lactide [2] | 109.03 |

TABLE 2-continued

| Ingredients | Parts by weight |
| --- | --- |
| Butyl stannoic acid | 1.14 |
| Triphenyl phosphite | 1.14 |
| Charge 2 | |
| Butyl acetate | 25.00 |

[2] An intramolecular cyclic di-ester monomer based on L-lactide, commercially available from CORBION.

Charge 1 was added to a 1000 mL, 4-necked flask equipped with a motor driven stainless steel stir blade, a water-cooled condenser, a nitrogen blanket, and a heating mantle with a thermometer connected through a temperature feedback control device. The reaction mixture was heated to 70° C. and held at 70° C. for 30 minutes. Then, the reaction mixture was heated to 130° C. The reaction mixture was held at 150° C. until IR spectroscopy showed the absence of the characteristic lactide band (936 cm-1) using a Thermo Scientific Nicolet iS5 FT-IR. The reaction mixture was cooled to 85° C. and Charge 2 was added to the reaction mixture. The final resin was stirred at 60° C. for 30 minutes and poured out. The weight average molecular weight of the polyester polyol was 1328 g/mol and the solids content was 80%. The weight average molecular weight was determined according to Example 1.

Example 3

Preparation of a Polyester Polyol

A polyester polyol according to the present invention was prepared from the components listed in Table 3.

TABLE 3

| Ingredients | Parts by weight |
| --- | --- |
| Charge 1 | |
| EPONEX ™ 1510[1] | 600.00 |
| Dimethylol Propionic Acid | 75.22 |
| 4-Tertbutylbenzoic Acid | 299.82 |
| Ethyltriphenylphosphonium iodide (ETPPI) | 4.40 |
| Triphenyl phosphite | 4.40 |
| Charge 2 | |
| Butyl acetate | 240.00 |

Charge 1 was added to a 3000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 180° C. After exotherm, the reaction mixture was held at 150° C. until an acid value of less than 0.2 mg KOH/g was obtained with a Metrohm 888 Titrando using a 0.1 N KOH solution in methanol as the reagent (3-4 hours). The reaction mixture was then cooled to 85° C. and Charge 2 was added to reaction mixture. The final resin was stirred at 60° C. for 30 minutes and poured out. The weight average molecular weight of the polyester polyol was 1053 g/mol and the solids content was 80%. The weight average molecular weight was determined according to Example 1.

Example 4

Preparation of a Polyester Polyol

A polyester polyol according to the present invention was prepared from the components listed in Table 4.

TABLE 4

| Ingredients | Parts by weight |
| --- | --- |
| Charge 1 | |
| EPONEX ™ 1510[1] | 400.00 |
| Dimethylol Propionic Acid | 50.15 |
| 4-Tertbutylbenzoic Acid | 199.88 |
| Ethyltriphenylphosphonium iodide (ETPPI) | 2.94 |
| Triphenyl phosphite | 2.94 |
| Charge 2 | |
| Butyl acetate | 240.00 |
| Charge 3 | |
| PURALACT ® B3 Lactide | 161.64 |
| Butyl stannoic acid | 0.84 |
| Triphenyl phosphite | 0.84 |
| Charge 4 | |
| Butyl acetate | 35.92 |

Charge 1 was added to a 2000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 183° C. After exotherm, the reaction mixture was held at 150° C. until an acid value of less than 0.2 mg KOH/g was obtained with a Metrohm 888 Titrando using a 0.1 N KOH solution in methanol as the reagent (3-4 hours). Charge 2 was added to the reaction mixture and the reaction mixture was cooled to 100° C. At 100° C., Charge 3 was added to reaction mixture. The reaction mixture was then heated to 130° C. and held at 130° C. until IR spectroscopy showed the absence of the characteristic lactide band (936 cm-1) using the Thermo Scientific Nicolet iS5 FT-IR. Then the reaction mixture was cooled to 85° C. and Charge 4 was added to the reaction mixture. The final resin was stirred at 60° C. for 30 minutes and poured out. The weight average molecular weight of the polyester polyol was 1380 g/mol and the solids content was 80%. The weight average molecular weight was determined according to Example 1.

Example 5

Preparation of a Polyester Polyol

A polyester polyol according to the present invention was prepared from the components listed in Table 5.

TABLE 5

| Ingredients | Parts by weight |
| --- | --- |
| Charge 1 | |
| EPONEX ™ 1510[1] | 600.00 |
| Benzoic Acid | 136.96 |
| Adipic acid | 81.95 |
| Ethyltriphenylphosphonium iodide (ETPPI) | 4.09 |
| Triphenyl phosphite | 4.09 |
| Charge #2 | |
| Butyl acetate | 206.77 |

Charge 1 was added to a 3000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 157° C. After exotherm, the reaction mixture was held at 150° C. until an acid value of less than 0.2 mg KOH/g was obtained with a Metrohm 888 Titrando using a 0.1 N KOH solution in methanol as the reagent (3-4 hours). The reaction mixture was then cooled to 85° C. and Charge 2 was added to the reaction mixture. The final resin was stirred at 60° C. for 30 minutes and poured out. The weight average molecular weight of the polyester polyol was 2357 g/mol and the solids content was 80%. The weight average molecular weight was determined according to Example 1.

Example 6

Preparation of a Polyester Polyol

A polyester polyol according to the present invention was prepared from the components listed in Table 6.

TABLE 6

| Ingredients | Parts by weight |
|---|---|
| Charge 1 | |
| EPONEX ™ 1510[1] | 600.00 |
| Benzoic acid | 136.96 |
| Cyclohexane dicarboxylic acid | 96.55 |
| Ethyltriphenylphosphonium iodide (ETPPI) | 4.09 |
| Triphenyl phosphite | 4.09 |
| Charge 2 | |
| Butyl acetate | 210.46 |

Charge 1 was added to a 3000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 177° C. After exotherm, the reaction mixture was held at 150° C. until an acid value of less than 0.2 mg KOH/g was obtained with a Metrohm 888 Titrando using a 0.1 N KOH solution in methanol as the reagent (3-4 hours). The reaction mixture was then cooled to 85° C. and Charge 2 was added to reaction mixture. The final resin was stirred at 60° C. for 30 minutes and poured out. The weight average molecular weight of the polyester polyol was 2187 g/mol and the solids content was 80%. The weight average molecular weight was determined according to Example 1.

Comparative Example 7

Preparation of a Polyester Polyol

A polyester polyol was prepared from the components listed in Table 7.

TABLE 7

| Ingredients | Parts by weight |
|---|---|
| Charge 1 | |
| Trimethylpentanediol | 379.16 |
| 4-methylhexahydrophthalic anhydride | 436.22 |
| Charge 2 | |
| EPONEX ™ 1510[1] | 600.00 |
| Ethytriphenylphosphonium iodide (ETPPI) | 0.30 |
| Butyl acetate | 342.86 |

Charge 1 was added to a 3000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 164° C. After exotherm, the reaction mixture was held at 150° C. until the acid value was around 173.34 mg KOH/g as determined with a Metrohm 888 Titrando using a 0.1 N KOH solution in methanol as the reagent (1-2 hours). The reaction mixture was then cooled to 100° C. and Charge 2 was added into the reaction mixture. Next, the reaction mixture was held at 150° C. until an acid value of less than 10 mg KOH/g was obtained with a Metrohm 888 Titrando using a 0.1 N KOH solution in methanol as the reagent (~16 hours). The reaction mixture was cooled to 60° C. and poured out. The weight average molecular weight of the polyester polyol was 2772 g/mol and the solids content was 80%. The weight average molecular weight was determined according to Example 1.

Example 8

Preparation of a Polyester Polyol

A polyester polyol according to the present invention was prepared from the components listed in Table 8.

TABLE 8

| Ingredients | Parts by weight |
|---|---|
| Charge 1 | |
| EPONEX ™ 1510[1] | 600.00 |
| Benzoic acid | 119.84 |
| Adipic acid | 112.72 |
| Ethyltriphenylphosphonium iodide (ETPPI) | 3.90 |
| Triphenyl phosphite | 4.40 |
| Charge 2 | |
| Butyl acetate | 218.18 |

Charge 1 was added to a 3000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 187° C. After exotherm, the reaction mixture was held at 150° C. until an acid value of less than 0.2 mg KOH/g was obtained with a Metrohm 888 Titrando using a 0.1 N KOH solution in methanol as the reagent (3-4 hours). Then the reaction mixture was cooled to 85° C. and Charge 2 was added into the reaction mixture. The final resin was stirred at 60° C. for 30 minutes and poured out. The weight average molecular weight of the polyester polyol was 4033 g/mol and the solids content was 80%. The weight average molecular weight was determined according to Example 1.

Example 9

Preparation of a Polyester Polyol

A polyester polyol according to the present invention was prepared from the components listed in Table 9.

TABLE 9

| Ingredients | Parts by weight |
| --- | --- |
| Charge 1 | |
| EPONEX ™ 1510[1] | 600.00 |
| Benzoic acid | 119.84 |
| Cyclohexane dicarboxylic acid | 132.77 |
| Ethyltriphenylphosphonium iodide (ETPPI) | 3.90 |
| Triphenyl phosphite | 4.40 |
| Charge 2 | |
| Butyl acetate | 218.18 |

Charge 1 was added to a 3000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 192° C. After exotherm, the reaction mixture was held at 150° C. until an acid value of less than 0.2 mg KOH/g was obtained with a Metrohm 888 Titrando using a 0.1 N KOH solution in methanol as the reagent (3-4 hours). Then the reaction mixture was cooled to 85° C. and Charge 2 was added into reaction mixture. The final resin was stirred at 60° C. for 30 minutes and poured out. The weight average molecular weight t of the polyester polyol was 3245 g/mol and the solids content was 80%. The weight average molecular weight was determined according to Example 1.

Comparative Example 10

Preparation of a Polyester Polyol

A polyester polyol according to the present invention was prepared from the components listed in Table 10.

TABLE 10

| Ingredients | Parts by weight |
| --- | --- |
| Charge 1 | |
| EPONEX ™ 1510[1] | 600.00 |
| Benzoic acid | 119.84 |
| Terephthalic acid | 128.14 |
| Ethyltriphenylphosphonium iodide (ETPPI) | 3.90 |
| Triphenyl phosphite | 4.40 |
| Charge 2 | |
| Butyl acetate | 218.18 |

Charge 1 was added to a 3000 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. At 120° C., the reaction mixture was exothermal up to 168° C. After exotherm, the reaction mixture was held at 150° C. until an acid value of less than 0.2 mg KOH/g was obtained with a Metrohm 888 Titrando using a 0.1 N KOH solution in methanol as the reagent (3-4 hours). Then the reaction mixture was cooled to 85° C. and Charge 2 was added into the reaction mixture. The final resin was stirred at 60° C. for 30 minutes and poured out. The weight average molecular weight of the polyester polyol was 5010 g/mol and the solids content was 80%. The weight average molecular weight was determined according to Example 1.

After three days of storage at ambient temperature, the resin began to develop crystallinity (haze). The polyester polyol resin therefore showed poor stability.

Example 11

Polyester Polyol Properties

The polyester polyols described in Examples 1-10 were tested for various properties which are listed in Table 11.

TABLE 11

| Example | Viscosity [3] (centipoise) | Mn [4] (g/mol) | Mw [4] (g/mol) | PDI [5] |
| --- | --- | --- | --- | --- |
| Example 1 | 370 | 731 | 994 | 1.36 |
| Example 2 | 490 | 923 | 1328 | 1.44 |
| Example 3 | 590 | 811 | 1053 | 1.30 |
| Example 4 | 615 | 1018 | 1871 | 1.36 |
| Example 5 | 710 | 1018 | 2357 | 2.31 |
| Example 6 | 770 | 945 | 2187 | 2.31 |
| Comparative Example 7 | 2370 | 1271 | 2772 | 2.18 |
| Example 8 | 1370 | 1405 | 4033 | 2.87 |
| Example 9 | 2500 | 1360 | 3245 | 2.39 |
| Comparative Example 10 | 4760 | 1416 | 5010 | 3.54 |

[3] Viscosity was determined at 50° C. and 75 RPM using BYK Cap 2000+ high torque viscometer with Number 2 spindle and the viscosity of the resins of Examples 8-10 were determined at 50° C. and 10 RPM using BYK Cap 2000+ high torque viscometer with Number 2 spindle.
[4] Number average molecular weight (Mn) and weight average molecular weight (Mw) were determined by gel permeation chromatography according to the description in Example 1.
[5] Polydispersity index (PDI) is the weight average molecular weight of each resin divided by the number average molecular weight of the resin.

As shown in Table 11, the polyester polyol of Comparative Example 10, which had 15 weight % of an aromatic diacid (based on the total solids weight of the reactants used to form the polyester polyol), exhibited the highest viscosity and considerably higher PDI than the polyester polyols of the present invention that were formed with aliphatic and cycloaliphatic diacids.

Examples 12-18

Preparation of Coating Compositions

Various coating compositions were prepared in three stages as described below.

Part A: A milled pigment mixture was first prepared from the components listed in Table 12.

TABLE 12

| Components | Ex. 12 | Ex. 13 | Ex. 14 | Ex. 15 | Ex. 16 | Ex. 17 | Comp. Ex. 18 |
| --- | --- | --- | --- | --- | --- | --- | --- |
| Polyester Example 1 | 37.23 | — | — | — | — | — | — |
| Polyester Example 2 | — | 40.42 | — | — | — | — | — |
| Polyester Example 3 | — | — | 39.65 | — | — | — | — |
| Polyester Example 4 | — | — | — | 40.28 | — | — | — |
| Polyester Example 5 | — | — | — | — | 37.40 | — | — |
| Polyester Example 6 | — | — | — | — | — | 36.54 | — |

TABLE 12-continued

| Components | Ex. 12 | Ex. 13 | Ex. 14 | Ex. 15 | Ex. 16 | Ex. 17 | Comp. Ex. 18 |
|---|---|---|---|---|---|---|---|
| Comparative Polyester Example 7 | — | — | — | — | — | — | 38.48 |
| n-butyl acetate | 9.98 | 9.76 | 10.39 | 10.06 | 9.67 | 9.89 | 9.54 |
| Sunfast Green 7 [6] | 0.78 | 0.77 | 0.78 | 0.77 | 0.75 | 0.76 | 0.73 |
| Mapico Yellow 1050A[7] | 5.20 | 5.17 | 5.18 | 5.13 | 4.99 | 5.08 | 4.87 |
| R-960-38 TiO2 [8] | 0.69 | 0.69 | 0.69 | 0.68 | 0.67 | 0.68 | 0.65 |
| Monolite Green 860 [9] | 0.49 | 0.49 | 0.49 | 0.48 | 0.47 | 0.48 | 0.46 |
| Hostaperm Yellow H3G [10] | 1.58 | 1.57 | 1.57 | 1.56 | 1.51 | 1.54 | 1.48 |
| Heucophos ZP-10 [11] | 2.92 | 2.90 | 2.90 | 2.88 | 2.79 | 2.84 | 2.73 |
| Disperbyk ®-163 [12] | 0.88 | 0.87 | 0.88 | 0.87 | 0.84 | 0.86 | 0.82 |

[6] Green phthalocyanine organic pigment, commercially available from Sun Chemical.
[7] Yellow ferric oxide hydrate inorganic pigment, commercially available from Huntsman.
[8] Rutile titanium dioxide inorganic pigment, commercially available from The Chemours Company.
[9] Green phthalocyanine organic pigment, commercially available from Heubach.
[10] Yellow benzimidazolone organic pigment, commercially available from Clariant.
[11] Zinc phosphate inorganic pigment, commercially available from Heubach.
[12] Wetting and dispersing additive, commercially available form BYK-Chemie GmbH.

In the first stage, the listed pigments in Table 12 were dispersed in a mixture comprising the corresponding polyester polyol, dispersants, and solvents to form a pre-mill mixture. The pre-mill mixture was then milled with a Lau 200 Disperser for 120 minutes and demonstrated a Hegman value of greater than 7, as determined by ASTM D1210-05.

Part B: The milled pigment mixtures were then agitated and letdown with the additional components listed in Table 13.

TABLE 13

| Components | Ex. 12 | Ex. 13 | Ex. 14 | Ex. 15 | Ex. 16 | Ex. 17 | Comp. Ex. 18 |
|---|---|---|---|---|---|---|---|
| n-butyl acetate | 5.44 | 6.18 | 5.42 | 6.52 | 9.31 | 7.59 | 10.92 |
| Flow additive[13] | 0.58 | 0.58 | 0.58 | 0.57 | 0.56 | 0.57 | 0.54 |
| BYK-3455 [14] | 0.17 | 0.17 | 0.17 | 0.17 | 0.17 | 0.17 | 0.16 |
| Tinuvin ® 292 [15] | 1.17 | 1.16 | 1.16 | 1.15 | 1.12 | 1.14 | 1.09 |
| Tinuvin ® 1130 [16] | 0.58 | 0.58 | 0.58 | 0.58 | 0.56 | 0.57 | 0.55 |
| Dibutyltin dilaurate | 0.03 | 0.03 | 0.03 | 0.03 | 0.03 | 0.03 | 0.03 |

[13] Acrylic based flow additive, commercially available from BASF.
[14] Wetting and leveling additive, commercially available form BYK-Chemie GmbH.
[15] Hindered amine light stabilizer, commercially available from BASF.
[16] UVA light stabilizer, commercially available from BASF.

Part C: Next, a polyisocyanate was added as listed in Table 14.

TABLE 14

| Components | Ex. 12 | Ex. 13 | Ex. 14 | Ex. 15 | Ex. 16 | Ex. 17 | Comparative Ex. 18 |
|---|---|---|---|---|---|---|---|
| GXH-1080 [17] | 32.27 | 28.65 | 29.54 | 28.28 | 29.18 | 31.28 | 26.95 |

[17] Solvated polyisocyanate, commercially available from PPG.

Example 19

Preparation and Evaluation of Coatings

Each of the coatings composition of Examples 12-18 were sprayed between 65-80 microns of a dry-film thickness over an iron phosphate pretreated cold rolled steel with a deionized water rinse treatment and a non-chrome phosphate free rinse treatment. The coatings were flashed for 10 minutes at ambient temperature and humidity conditions, then baked at 60° C. for 20 minutes. The coating properties of each formed coating are listed in Table 15.

TABLE 15

| | Ex. 12 | Ex. 13 | Ex. 14 | Ex. 15 | Ex. 16 | Ex. 17 | Comp. Ex. 18 |
|---|---|---|---|---|---|---|---|
| Viscosity Stage 1 + 2 (cP) [18] | 80 | 80 | 85 | 80 | 78 | 83 | 83 |
| % Volume Solids [19] | 61.29 | 60.65 | 61.36 | 60.2 | 58.12 | 59.54 | 56.93 |
| V.O.C. [20] | 2.84 | 2.89 | 2.83 | 2.9 | 3.07 | 2.97 | 3.16 |
| 20° Gloss [21] | 86.3 | 84.5 | 85.5 | 86.3 | 85.6 | 86.4 | 84.9 |
| Appearance/Popping [22] | Good/Low | Very Good/Very Low | Very Good/Very Low | Best/None | Good/None | Good/None | Good/None |
| Konig @ 2 hour. (sec.) [23] | 68 | 71 | 75 | 75 | 44 | 27 | N/A (tacky) |
| Konig @ 24 hour. (sec.) [23] | 149 | 146 | 145 | 147 | 135 | 115 | 87 |
| 20 Deg. Gloss after 4000 hrs. [24] | 64.7 | 73.4 | 71.6 | 75.9 | 66.3 | 70.6 | 44.8 |

TABLE 15-continued

| | Ex. 12 | Ex. 13 | Ex. 14 | Ex. 15 | Ex. 16 | Ex. 17 | Comp. Ex. 18 |
|---|---|---|---|---|---|---|---|
| Scraped Scribe Creep (mm) after 360 hrs. [25] | 6.92 | 8.25 | 8.36 | 7.98 | 6.70 | 9.17 | 10.19 |

[18] Viscosity at 23° C. was determined using a BYK Cap 2000+ high torque viscometer with a Number 2 spindle at 750 RPM.
[19] Volume of non-volatile matter measured in accordance with ASTM D2697-03(2014).
[20] Amount of volatile organic compounds measured in accordance with ASTM D3960-05(2018).
[21] Specular gloss measured in accordance with ASTM D523-14(2018).
[22] Visual rating of relative coating smoothness and density of solvent pops on a 4 × 12 sq. inch coating sample.
[23] Konig method of pendulum hardness measuring dampening from 6 to 3 degrees according to ASTM D4366-95.
[24] Gloss of a coating after exposure to accelerated weathering conditions measured in accordance with SAE J2527.
[25] Corrosion resistance of a coating measured in accordance with ASTM B117-16 and ASTM D1654-08(2016)e1.

As shown in Table 15, the liquid coatings containing the polyester polyols of the present invention demonstrated good viscosity at low levels of VOC's as compared to Comparative Example 18. The liquid coatings containing the polyester polyols of the present invention also demonstrated faster early property development (2 and 24 hr. Konig hardness) while maintaining good appearance and improved 20 degree gloss retention after 4000 hrs. of accelerated weathering as compared to Comparative Example 18. The liquid coatings containing the polyester polyols of the present invention further exhibited improved corrosions resistance as compared to Comparative Example 18.

The present invention is also directed to the following clauses.

Clause 1: A polyol polymer obtained from reactants comprising: a) a non-aromatic epoxy functional compound that comprises at least 30 weight % of the total solids weight of the reactants; and b) an aromatic mono-carboxylic acid functional compound, or anhydride thereof, that is substantially free of non-aromatic ethylenic unsaturation, wherein the polyol polymer comprises ester linkages and hydroxyl functional groups, and wherein, if the reactants further comprise an aromatic polycarboxylic acid, the aromatic polycarboxylic acid comprises less than 15 weight % of the total solids weight of the reactants.

Clause 2: The polymer of clause 1, wherein the non-aromatic epoxy functional compound comprises a cycloaliphatic diglycidyl ether, a cycloaliphatic diglycidyl ester, a cycloaliphatic epoxide, or any combination thereof.

Clause 3: The polymer of clause 1, wherein the non-aromatic epoxy functional compound comprises a hydrogenated bisphenol polyepoxide or a polyepoxide derived from a hydrogenated bisphenol compound.

Clause 4: The polymer of any one of clauses 1-3, wherein the non-aromatic epoxy functional compound comprises at least 40 weight % of the total solids weight of the reactants.

Clause 5: The polymer of any one of clauses 1-4, wherein the reactants further comprise a non-aromatic mono-carboxylic acid.

Clause 6: The polymer of clause 5, wherein the non-aromatic mono-carboxylic acid further comprises a hydroxyl group.

Clause 7: The polymer of any one of clauses 1-6, wherein the reactants further comprise a non-aromatic polycarboxylic acid.

Clause 8: The polymer of any one of clauses 1-7, wherein the reactants further comprise an intramolecular cyclic ester.

Clause 9: The polymer of any one of clauses 1-8, wherein the polyol polymer has a polydispersity index of 3.50 or less.

Clause 10: The polymer of any one of clauses 1-9, wherein the polyol polymer has a hydroxyl value of at least 50 mg KOH/g.

Clause 11: The polymer of any one of clauses 1-10, wherein the polyol polymer comprises carboxylic acid functional groups and epoxy functional groups, and has an epoxy-to-acid ratio of greater than 0.95.

Clause 12: A coating composition comprising: i) a polyol polymer according to any one of clauses 1-11; and ii) a crosslinker reactive with the polyol polymer.

Clause 13: The coating composition of clause 12, wherein the crosslinker comprises a polyisocyanate, aminoplast, or a combination thereof.

Clause 14: The coating composition of clauses 12 or 13, further comprising a non-aqueous solvent.

Clause 15: The coating composition of any one of clauses 12-14, further comprising a colorant.

Clause 16: A substrate at least partially coated with a coating formed from the composition of any one of clauses 12-15.

Clause 17: The substrate of clause 16, wherein the coating is formed directly over a surface of the substrate.

Clause 18: A method of forming a polyol polymer comprising: a) reacting reactants comprising: i) a non-aromatic epoxy functional compound that comprises at least 30 weight % of the total solids weight of the reactants; and ii) an aromatic mono-carboxylic acid functional compound, or anhydride thereof, that is substantially free of non-aromatic ethylenic unsaturation, wherein the polyol polymer comprises ester linkages and hydroxyl functional groups, and wherein, if the reactants further comprise an aromatic polycarboxylic acid, the aromatic polycarboxylic acid comprises less than 15 weight % of the total solids weight of the reactants.

Clause 19: The method of clause 18, wherein the polyol polymer is a polyol polymer as described in any one of clauses 1-11.

Clause 20: The method of clauses 18 or 19, wherein the reactants of step a) further comprise a non-aromatic mono-carboxylic acid, a non-aromatic polycarboxylic acid, or a combination thereof.

Clause 21: The method of any one of clauses 18-20, further comprising b) reacting a reaction product from step a) with an intramolecular cyclic ester.

Whereas particular embodiments of this invention have been described above for purposes of illustration, it will be evident to those skilled in the art that numerous variations of the details of the present invention may be made without departing from the invention as defined in the appended claims.

The invention claimed is:

1. A polyol polymer obtained from reactants comprising:
   a) a non-aromatic epoxy functional compound that comprises at least 30 weight % of the total solids weight of the reactants;
   b) an aromatic mono-carboxylic acid functional compound, or anhydride thereof, that is substantially free of non-aromatic ethylenic unsaturation and free of hydroxyl groups, and that comprises at least 10 weight % of the total solids weight of the reactants, and
   c) a reactant selected from dimethylol propionic acid, 1,4-cyclohexanedicarboxylic acid, 1,3-cyclohexanedicarboxylic acid, decahydronaphthalene dicarboxylic acid, 1,3-cyclopentanedicarboxylic acid, 1,1-cyclopropanedicarboxylic acid, hexahydrophthalic acid, succinic acid, adipic acid, azelaic acid, citric acid, anhydrides of such acids, and combinations thereof;
   wherein the polyol polymer comprises ester linkages and hydroxyl functional groups,
   wherein, if the reactants further comprise an aromatic polycarboxylic acid, the aromatic polycarboxylic acid comprises less than 5 weight % of the total solids weight of the reactants, and
   wherein the polyol polymer has a polydispersity index of 3.50 or less.

2. The polymer of claim 1, wherein the non-aromatic epoxy functional compound comprises a cycloaliphatic diglycidyl ether, a cycloaliphatic diglycidyl ester, a cycloaliphatic epoxide, or any combination thereof.

3. The polymer of claim 1, wherein the non-aromatic epoxy functional compound comprises a hydrogenated bisphenol polyepoxide or a polyepoxide derived from a hydrogenated bisphenol compound.

4. The polymer of claim 1, wherein the non-aromatic epoxy functional compound comprises at least 40 weight % of the total solids weight of the reactants.

5. The polymer of claim 1, wherein the reactant c) comprises dimethylol propionic acid.

6. The polymer of claim 1, wherein the reactant c) comprises adipic acid, 1,4-cyclohexanedicarboxylic acid, or 1,3-cyclohexanedicarboxylic acid.

7. The polymer of claim 1, wherein the reactants further comprise an intramolecular cyclic ester.

8. The polymer of claim 1, wherein the polyol polymer has a hydroxyl value of at least 50 mg KOH/g.

9. The polymer of claim 1, wherein the polyol polymer comprises carboxylic acid functional groups and epoxy functional groups, and has an epoxy-to-acid ratio of greater than 0.95.

10. A coating composition comprising:
    i) a polyol polymer according to claim 1; and
    ii) a crosslinker reactive with the polyol polymer.

11. The coating composition of claim 10, wherein the crosslinker comprises a polyisocyanate, aminoplast, or a combination thereof.

12. The coating composition of claim 10, further comprising a non-aqueous solvent.

13. The coating composition of claim 10, further comprising a colorant.

14. The coating composition of claim 10, wherein the reactant c) comprises dimethylol propionic acid.

15. The coating composition of claim 10, wherein the reactant c) comprises adipic acid, 1,4-cyclohexanedicarboxylic acid, or 1,3-cyclohexanedicarboxylic acid.

16. The coating composition of claim 10, wherein the reactants that form the polyol polymer further comprise an intramolecular cyclic ester.

17. A substrate at least partially coated with a coating formed from the composition of claim 10.

18. The substrate of claim 17, wherein the coating is formed directly over a surface of the substrate.

19. A method of forming a polyol polymer comprising:
    a) reacting reactants comprising:
       i) a non-aromatic epoxy functional compound that comprises at least 30 weight % of the total solids weight of the reactants;
       ii) an aromatic mono-carboxylic acid functional compound, or anhydride thereof, that is substantially free of non-aromatic ethylenic unsaturation and free of hydroxyl groups, and that comprises at least 10 weight % of the total solids weight of the reactants, and
       iii) a reactant selected from dimethylol propionic acid, 1,4-cyclohexanedicarboxylic acid, 1,3-cyclohexanedicarboxylic acid, decahydronaphthalene dicarboxylic acid, 1,3-cyclopentanedicarboxylic acid, 1,1-cyclopropanedicarboxylic acid, hexahydrophthalic acid, succinic acid, adipic acid, azelaic acid, citric acid, anhydrides of such acids, and combinations thereof;
    wherein the polyol polymer comprises ester linkages and hydroxyl functional groups,
    wherein, if the reactants further comprise an aromatic polycarboxylic acid, the aromatic polycarboxylic acid comprises less than 5 weight % of the total solids weight of the reactants, and wherein the polyol polymer has a polydispersity index of 3.50 or less.

20. The method of claim 19, further comprising b) reacting a reaction product from step a) with an intramolecular cyclic ester.

* * * * *